(12) United States Patent
Koseki et al.

(10) Patent No.: US 8,269,873 B2
(45) Date of Patent: Sep. 18, 2012

(54) SOLID-STATE IMAGING DEVICE AND LOAD CURRENT SOURCE CIRCUIT

(75) Inventors: Ken Koseki, Kanagawa (JP); Kuniaki Kataoka, Kanagawa (JP)

(73) Assignee: Sony Corporation, Tokyo (JP)

( * ) Notice: Subject to any disclaimer, the term of this patent is extended or adjusted under 35 U.S.C. 154(b) by 161 days.

(21) Appl. No.: 12/923,851

(22) Filed: Oct. 12, 2010

(65) Prior Publication Data

US 2011/0115958 A1    May 19, 2011

(30) Foreign Application Priority Data

Nov. 19, 2009  (JP) ................................. 2009-263455

(51) Int. Cl.
*H04N 5/335* (2011.01)
(52) U.S. Cl. ......................................................... 348/308
(58) Field of Classification Search .................. 348/308
See application file for complete search history.

(56) References Cited

U.S. PATENT DOCUMENTS

| | | | | |
|---|---|---|---|---|
| 5,335,008 | A * | 8/1994 | Hamasaki | 348/301 |
| 7,183,531 | B2 * | 2/2007 | Olsen et al. | 250/208.1 |
| 7,362,366 | B2 * | 4/2008 | Egawa et al. | 348/308 |
| 7,476,837 | B2 * | 1/2009 | Koyama | 250/208.1 |
| 2002/0109160 | A1 | 8/2002 | Mabuchi et al. | |
| 2007/0146514 | A1 * | 6/2007 | Maeda et al. | 348/294 |
| 2008/0185502 | A1 * | 8/2008 | Koyama | 250/214 LS |
| 2008/0252764 | A1 * | 10/2008 | Shinohara | 348/308 |
| 2012/0092540 | A1 * | 4/2012 | Shinohara | 348/308 |

FOREIGN PATENT DOCUMENTS

JP    2002-217397    8/2002

* cited by examiner

*Primary Examiner* — James Hannett
(74) *Attorney, Agent, or Firm* — Rader Fishman & Grauer, PLLC

(57) ABSTRACT

Disclosed herein is a solid-state imaging device including: a plurality of pixel circuits each of which converts an optical signal into a pixel signal; a load current source circuit adapted to supply a load current, used to read out the pixel signal from the plurality of pixel circuits, to the pixel circuits on a column-by-column basis; a signal readout circuit adapted to read out a reference signal and the pixel signal from the pixel circuits on a row-by-row basis and output the difference between the reference and pixel signals that have been read out; and a control signal generation circuit adapted to generate a maintenance control signal used to maintain the load current constant during a readout period that lasts from when the reference signal is read out by the signal readout circuit to when the pixel signal is read out by the signal readout circuit.

6 Claims, 10 Drawing Sheets

F I G. 1
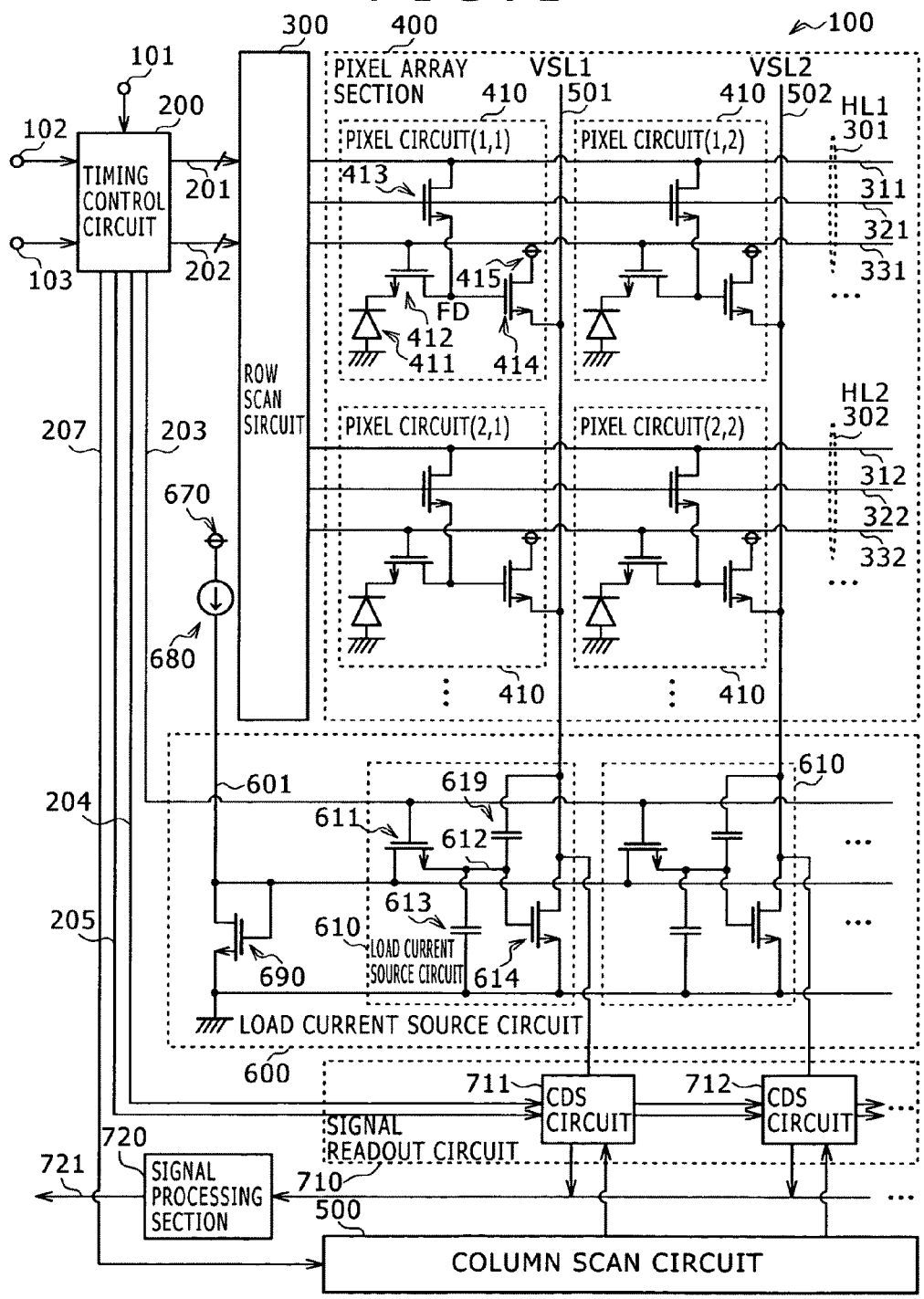

SOLID-STATE IMAGING DEVICE AND LOAD CURRENT SOURCE CIRCUIT

BACKGROUND OF THE INVENTION

1. Field of the Invention

The present invention relates to a solid-state imaging device, and more particularly, to a MOS solid-state imaging device and load current source circuit.

2. Description of the Related Art

MOS (Metal Oxide Semiconductor) solid-state imaging devices are known as solid-state imaging devices. In a MOS solid-state imaging device, the potential resulting from the charge generated by a photoelectric conversion element is amplified by an amplifying transistor, after which the amplified signal is read out. For example, a MOS solid-state imaging device has been proposed that reads out the reset levels of the reference and pixel signals output to the vertical signal lines by the amplifying transistors in the pixel circuits and outputs the difference between the two levels (refer, for example, to Japanese Patent Laid-Open No. 2002-217397 (FIG. 1)). Reading out the reference and pixel signals as described above is called correlated double sampling. Here, a brief description will be given below of a configuration example of a MOS solid-state imaging device operable to handle correlated double sampling with reference to the accompanying drawing.

FIG. 8 is a circuit diagram illustrating a configuration example of a solid-state imaging device in related art. This solid-state imaging device 800 in related art includes a timing control circuit 810, row scan circuit 820, column scan circuit 830, pixel array section 840 and load current source circuit 860. The solid-state imaging device 800 further includes a signal readout circuit 880 and signal processing section 890.

The pixel array section 840 includes a plurality of pixel circuits 850 arranged in a two-dimensional matrix (n by m). The pixel array section 840 further includes horizontal line (HL) sets 829 that are arranged one set in each row of the pixel circuits 850 and vertical signal lines (VSL) 839 that are arranged one in each column of the pixel circuits 850.

On the other hand, the load current source circuit 860 includes a reference transistor 861 and load current supply circuits 870 that are arranged one in each column of the pixel circuits 850. Further, each of the load current supply circuits 870 includes a load transistor 874 and parasitic capacitor 879. Still further, the signal readout circuit 880 includes a plurality of CDS (Correlated Double Sampling) circuits 881 and 882 that are arranged one in each column of the pixel circuits 850.

The timing control circuit 810 controls the timings of the image signal generation performed by the row scan circuit 820, column scan circuit 830 and pixel array section 840. The timing control circuit 810 generates a timing control signal used to generate an image signal. The image signal is generated as the signals, output from the pixel circuits 850 of the pixel array section 840 on a row-by-row basis, are read out in the column direction. That is, the timing control circuit 810 controls the timings for the generation of an image signal using column parallel readout.

The timing control circuit 810 supplies readout pulses, one adapted to read out a reference signal and another adapted to read out a pixel signal output from each of the pixel circuits 850, to the signal readout circuit 880 via a reference signal readout control line 814 and pixel signal readout control line 815. Further, the timing control circuit 810 supplies a column scan control signal used to control the column scan circuit 830 via a column scan control line 817.

The row scan circuit 820 successively generates row scan signals based on a row address signal and timing signal supplied from the timing control circuit 810. The row scan signals are adapted to cause the pixel circuits 850 to output signals on a row-by-row basis. The row scan circuit 820 supplies the generated row scan signals to the horizontal lines (HL) 829.

Each of the pixel circuits 850 converts incident light or optical signal into an electric signal through photoelectric conversion. The pixel circuit 850 amplifies the electric signal with an FD amplifier that has a floating diffusion (FD).

On the other hand, each of the pixel circuits 850 includes a photoelectric conversion element 851, transfer transistor 852, reset transistor 853 and amplifying transistor 854. The photoelectric conversion element 851 generates electric charge commensurate with the light intensity.

The transfer transistor 852 transfers electrons, generated by the photoelectric conversion element 851, to the floating diffusion FD according to a transfer pulse supplied from the row scan circuit 820. The reset transistor 853 sets (charges) the floating diffusion FD to a constant reference potential according to a reset pulse supplied from the row scan circuit 820.

The amplifying transistor 854 amplifies the potential generated in the floating diffusion FD and outputs a signal commensurate with the amplified potential to the vertical signal line (VSL) 839. The amplifying transistor 854 forms a source follower circuit together with the load transistor 874. That is, the amplifying transistor 854 amplifies the potential generated in the floating diffusion FD according to the load current supplied from the load transistor 874.

The amplifying transistor 854 amplifies the reference potential generated in the floating diffusion FD and outputs the amplified reference potential to the vertical signal line (VSL) 839 as a reference potential. This reference signal is used by the CDS circuit 881 or 882 to remove specific noise components from the pixel circuits 850.

Further, the amplifying transistor 854 amplifies the potential generated as a result of the accumulation of the electrons, transferred from the transfer transistor 852, in the floating diffusion FD and outputs the amplified potential to the vertical signal line (VSL) 839 as a pixel signal.

The column scan circuit 830 generates an output control signal based on a row scan control signal supplied from the timing control circuit 810. The output control signal causes the signal readout circuit 880 to output the pixel signals of each column to the signal processing section 890. The column scan circuit 830 supplies the generated output control signal to the CDS circuits 881 and 882.

A reference current generation circuit 862 is a constant current circuit adapted to supply a reference current to a reference current line 863. The reference current generation circuit 862 supplies the generated reference current to the load current source circuit 860 via the reference current line 863.

The load current source circuit 860 supplies a load current to each of the vertical signal lines (VSL) 839 based on the reference current supplied from the reference current generation circuit 862. The reference transistor 861 causes the load transistor 874 in each column to generate a load current that is approximately equal to the reference current (bias current) supplied from the reference current generation circuit 862. The reference transistor 861 ensures that a constant load current is supplied to the vertical signal line in each column from the load transistor 874. That is, the reference transistor 861 forms a current mirror circuit together with the load transistor 874 in each column.

Each of the load transistors 874 supplies a load current, commensurate with the reference current supplied to the reference transistor 861, to the vertical signal line (VSL) 839. Further, each of the load transistors 874 supplies a load current, used to drive the amplifying transistors 854, to the vertical signal line (VSL) 839.

The parasitic capacitor 879 includes a parasitic capacitor generated between the gate and drain of the load transistor 874 and an interwire capacitor formed between the vertical signal line (VSL) 839 and a load transistor gate line 872. This parasitic capacitor 879 produces coupling between the vertical signal line (VSL) 839 and load transistor gate line 872 in each column. That is, the potential of the load transistor gate line 872 changes with change in the signal level of the vertical signal line (VSL) 839.

The signal readout circuit 880 subjects the pixel signals output from the pixel array section 840 to correlated double sampling, thus removing fixed pattern noise. The CDS circuits 881 and 882 read out the reference and pixel signals output from each of the pixel circuits 850 according to the readout pulses supplied via the reference signal readout control line 814 and pixel signal readout control line 815. The CDS circuits 881 and 882 take the difference in level between the reference and pixel signals to remove fixed pattern noise. The CDS circuits 881 and 882 supply the noise-free pixel signals to the signal processing section 890.

The signal processing section 890 converts each of the pixel signals, i.e., analog signals, supplied from the CDS circuits 881 and 882, into a digital signal. The signal processing section 890 outputs the digital signal to a signal output line 891 as an image signal.

As described above, the solid-state imaging device 800 removes noise components produced by the pixel circuits 850 through correlated double sampling.

SUMMARY OF THE INVENTION

The above related art outputs the difference between the reset and signal levels output from the pixel circuit to remove noise components from the signal level. In this case, however, the load current, supplied by the load transistor that forms a source follower circuit together with the amplifying transistor, changes due, for example, to thermal noise of the reference transistor that forms a current mirror circuit together with the load transistor in each column. This changes the amplification gain of the amplifying transistor. As a result, a noise component resulting from the change in load current is superposed on the reset and signal levels, possibly making it impossible to obtain an accurate signal level.

Further, if the vertical signal line (VSL) 839 changes in signal level, horizontal band noise may develop in the load transistor gate line 872 due to its coupling via the parasitic capacitor 879. A description will be given below of an example in which horizontal band noise develops as a result of the change in signal level of the vertical signal line (VSL) 839 with reference to the accompanying drawings.

FIGS. 9A and 9B are conceptual diagrams illustrating captured images affected by coupling that takes place as a result of the change in signal level of the vertical signal line via the parasitic capacitor 879 in the solid-state imaging device 800 in related art.

FIG. 9A is a conceptual diagram illustrating the captured target of the solid-state imaging device 800 in related art. Black regions 831 and 833 and a white region 832 are shown in the target. The black regions 831 and 833 are in the same color.

FIG. 9B is a conceptual diagram illustrating the captured image when the target shown in FIG. 9A is imaged with the solid-state imaging device 800 in related art. The captured image shows a black region 841, white region 842 and dark black region 843. Further, a vertical line 'a' 844 and another vertical line 'b' 845 are shown by dotted lines here for reasons of convenience.

As described above, the black region 833 appears as the dark black region 843 in the image captured by the solid-state imaging device 800 in related art as a result of the change in signal level of the vertical signal line 839 associated with the white region 832. That is, horizontal band noise develops in the captured image. A description will be given here of the cause of why the black region 833 appears as the dark black region 843 with reference to the accompanying drawing.

FIG. 10 is a diagram illustrating the cause of why the captured image shown in FIG. 9B is produced by the solid-state imaging device 800 in related art. Here, FIG. 10 shows the changes in potential of the vertical signal lines 839 associated with the vertical lines 'a' and 'b' and the load transistor gate line 872, with the horizontal axis representing the time axis. On the other hand, the reference signal readout period and pixel signal readout period are respectively the periods during which the reference signal and pixel signal are read out by the signal readout circuit 880.

The vertical signal line 839 associated with the vertical line 'a' shows a potential change in the vertical signal line 839 associated with the vertical line 'a' 844 shown in FIG. 9B. Two characteristics, namely, a white region characteristic 801 indicated by a solid line and a black region characteristic 802 indicated by a dashed line, are shown in the vertical signal line 839 associated with the vertical line 'a.'

The white region characteristic 801 represents the characteristic of the signal level output from the pixel circuits 850 that are connected to the vertical signal line 839 associated with the vertical line 'a' of all the pixel circuits 850 of the solid-state imaging device 800 in related art associated with the white region 832. In this white region characteristic 801, the pixel signal level drops to a white potential (VW) corresponding to the white level on the screen during the pixel signal readout period. That is, the signal level supplied from the pixel circuit 850 to the vertical signal line 839 associated with the vertical line 'a' changes significantly.

The pixel signal level drops as described above because many electrons, generated by the photoelectric conversion element 851 due to high optical intensity of the white region 832, are transferred to the floating diffusion FD. This leads to a lower gate potential of the amplifying transistor 854, significantly reducing the pixel signal level during the pixel signal readout period.

The black region characteristic 802 represents the characteristic of the signal level output from the pixel circuits 850 that are connected to the vertical signal line 839 associated with the vertical line 'a' of all the pixel circuits 850 associated with the black region 831. In this black region characteristic 802, the pixel signal level remains unchanged at the reference signal level during the pixel signal readout period.

The pixel signal level remains unchanged as described above because electrons are scarcely generated by the photoelectric conversion element 851 due to low optical intensity of the black region 831 and, therefore, the gate potential of the amplifying transistor 854 changes only to a negligibly small extent. As a result, the pixel signal level output from the amplifying transistor 854 is maintained at a black potential (VB) that is identical in level to the reference signal level corresponding to the black level on the screen.

The load transistor gate line 872 shows the change in potential of the gate terminal of the load transistor 874. This load transistor gate line 872 is affected by coupling as a result of the change in signal level of the vertical signal line 839 associated with the vertical line 'a' via the parasitic capacitor 879. Therefore, the potential of the load transistor gate line 872 drops by a coupling change ($\Delta V$) as a result of a steep decline in signal level caused by the white region characteristic 801 of the vertical signal line 839 associated with the vertical line 'a.'

The gate voltage of the load transistor 874 drops as a result of the coupling change ($\Delta V$) that develops in the load transistor gate line 872, thus reducing the load current during the pixel signal readout period.

The vertical signal line 839 associated with the vertical line 'b' shows the potential change of the vertical signal line 839 associated with the vertical line 'b' 845 illustrated in FIG. 9B. This vertical signal line 839 associated with the vertical line 'b' shows two characteristics, namely, a dark black region characteristic 803 indicated by a solid line and a black region characteristic 804 indicated by a dashed line. Here, the black region characteristic 804 is identical to the black region characteristic 802 of the vertical signal line 839 associated with the vertical line 'a.' Therefore, the description thereof is omitted.

The dark black region characteristic 803 represents the characteristic of the signal level output from the pixel circuits 850 that are connected to the vertical signal line 839 associated with the vertical line 'b' of all the pixel circuits 850 associated with the black region 833. In this dark black region characteristic 803, the pixel signal level rises to a level (VB') higher than the black potential during the pixel signal readout period.

This rise of the pixel signal level is caused by the coupling change ($\Delta V$) that develops in the load transistor gate line 872. That is, the load current supplied to the pixel circuit 850 diminishes as a result of the reduction of the gate voltage of the load transistor 874. This increases the amplification gain of the amplifying transistor 854 in the pixel circuit 850, thus raising the pixel signal level higher than the black potential (VB).

As described above, the signal level output from the pixel circuits 850 associated with the white region 832 via the vertical signal line 839 changes significantly. Therefore, the potential of the load transistor gate line 872 drops by the coupling change ($\Delta V$) via the parasitic capacitor 879. As a result, the load current supplied by the load transistor 874 to the amplifying transistor 854 diminishes, raising the pixel signal level in a vertical signal line 839 associated with the black region 833. This causes the black region 833 of the target shown in FIG. 9A to be displayed as the dark black region 843 of the captured image shown in FIG. 9B.

In light of the foregoing, it is an object of the present invention to maintain the load current, supplied to the amplifying transistors of the pixel circuits, constant.

The present invention has been made to solve the above problem. A first embodiment of the present invention is a solid-state imaging device that includes a plurality of pixel circuits, load current source circuit, signal readout circuit and control signal generation circuit. Each of the plurality of pixel circuits converts an optical signal into a pixel signal. The load current source circuit supplies a load current, used to read out the pixel signal from the plurality of pixel circuits, to the pixel circuits on a column-by-column basis. The signal readout circuit reads out a reference signal and the pixel signal from the pixel circuits on a row-by-row basis and outputs the difference between the reference and pixel signals that have been read out. The control signal generation circuit generates a maintenance control signal used to maintain the load current constant during a readout period that lasts from when the reference signal is read out by the signal readout circuit to when the pixel signal is read out by the signal readout circuit. The load current source circuit includes a plurality of load transistors, voltage holding circuit and voltage setting circuit. The plurality of load transistors supply the load current to the pixel circuits on a column-by-column basis. The voltage holding circuit stabilizes the gate voltage of the load transistor so as to maintain the load current constant. The voltage setting circuit sets the voltage holding circuit to a constant hold voltage based on the maintenance control signal. As a result, the voltage setting circuit sets the voltage holding circuit to a constant hold voltage based on the maintenance control signal generated by the control signal generation circuit during a readout period that lasts from when the reference signal is read out by the signal readout circuit to when the pixel signal is read out by the signal readout circuit. This stabilizes the gate voltage of the load transistor.

Alternatively in the first embodiment of the present invention, the control signal generation circuit may generate a maintenance control signal used to maintain the load current constant during a readout period that lasts from when a reference signal is read out on a row-by-row basis by the signal readout circuit to when a pixel signal is read out on a row-by-row basis by the same circuit. This stabilizes the gate voltage of the load transistor during the readout period for each row.

Still alternatively in the first embodiment, the voltage holding circuit may include a plurality of holding capacitors, one for each column of the plurality of pixel circuits, to stabilize the gate voltage of the load transistor, and the voltage setting circuit may set each of the plurality of holding capacitors to the hold voltage based on the maintenance control signal. This provides a holding capacitor for the load transistor in each column, thus stabilizing the gate voltage of the load transistor. In this case, the load current source circuit may further include a plurality of second load transistors, second voltage holding circuit and second voltage setting circuit. The plurality of second load transistors supply the load current to the pixel circuits on a column-by-column basis. The second voltage holding circuit stabilizes the gate voltages of the second load transistors. The second voltage setting circuit sets the second voltage holding circuit to the hold voltage. This suppresses the change in gate voltage of the load transistor caused by the potential change of the vertical signal lines adapted to supply the load current to the pixel circuits.

Still alternatively in the first embodiment, the control signal generation circuit may generate a charge control signal used to charge the capacitance of the voltage holding circuit during a preparatory period prior to the start of the readout period, and the voltage setting circuit may connect the gate terminal of a reference transistor associated with the load transistor to one end of the voltage holding circuit based on the charge control signal. This charges the capacitance of the voltage holding circuit during the preparatory period based on the charge control signal generated by the control signal generation circuit.

A second embodiment of the present invention is a load current source circuit that includes load transistors, voltage holding circuit and voltage setting circuit. Each of the load transistors has its drain terminal connected to a vertical signal line adapted to supply a load current to pixel circuits. The voltage holding circuit has its one end connected to the source terminals of the load transistors. The voltage setting circuit has its gate terminal connected to a maintenance control signal line adapted to supply a maintenance control signal so as to stabilize the load current. The voltage setting circuit has its source terminal connected to the gate terminals of the load transistors and the other end of the voltage holding circuit. This allows for the voltage setting circuit to set the voltage holding circuit to a constant hold voltage, thus stabilizing the gate voltage of the load transistor.

The present invention provides an excellent advantageous effect in that the load current supplied to the amplifying transistors of the pixel circuits can be maintained constant.

BRIEF DESCRIPTION OF THE DRAWINGS

FIG. 1 is a circuit diagram illustrating a configuration example of a solid-state imaging device according to a first embodiment of the present invention;

DETAILED DESCRIPTION OF THE PREFERRED EMBODIMENTS

Figure 2:
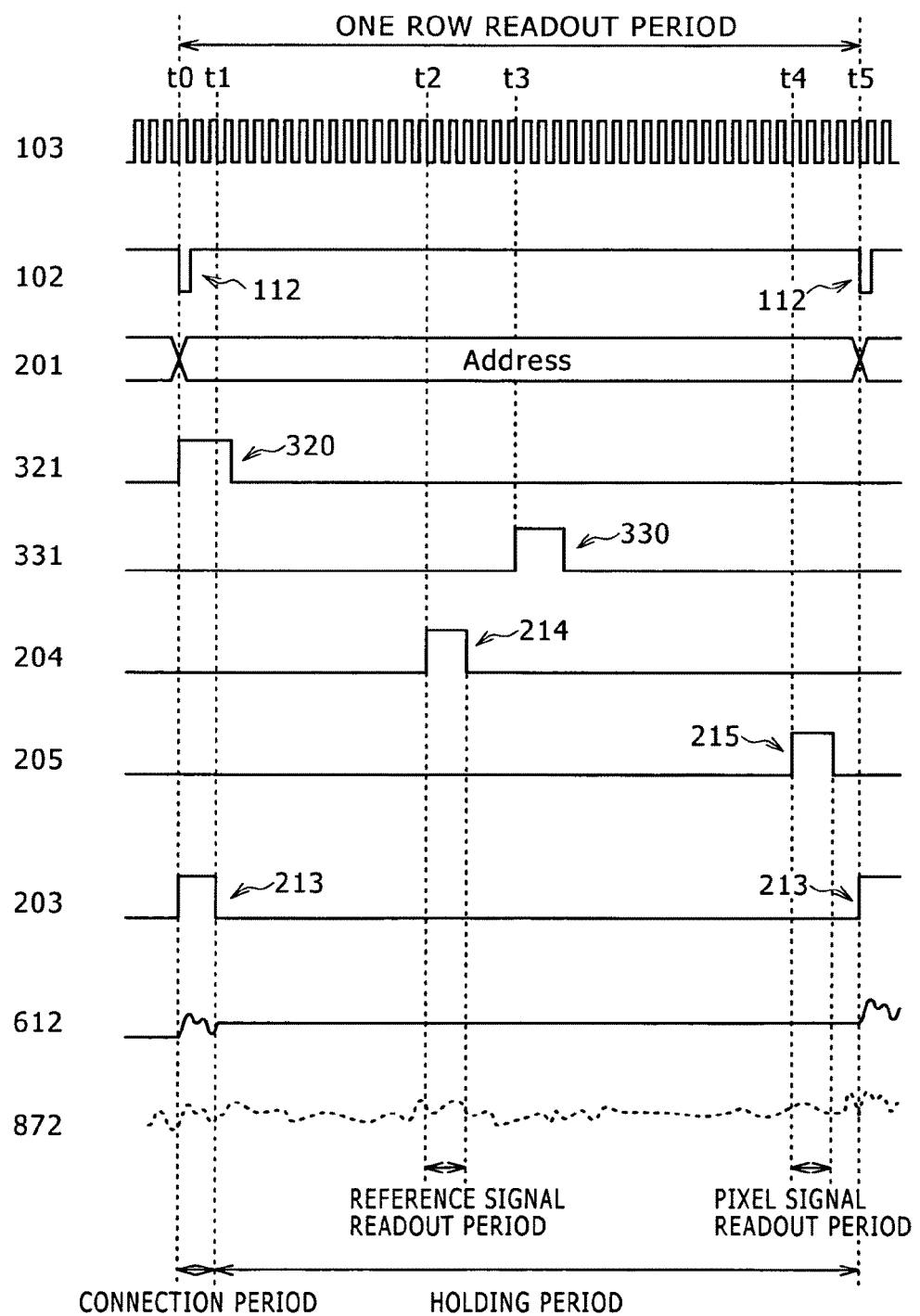
FIG. 2 is a timing diagram illustrating an operation example of a solid-state imaging device according to the first embodiment of the present invention.

A description will be given below of preferred embodiments for carrying out the present invention (hereinafter referred to as the embodiments). It should be noted that the description will be given in the following order:
1. First embodiment (load current stabilization control: example of load current supply circuit in which a setting transistor and a holding capacitor are provided for each column)
2. Second embodiment (load current stabilization control: example in which a load current source circuit includes load current supply circuits that are cascoded together)
3. Third embodiment (load current stabilization control: example in which only one setting transistor and one holding capacitor are provided)

1. First Embodiment

Configuration Example of the Solid-State Imaging Device

FIG. 1 is a circuit diagram illustrating a configuration example of a solid-state imaging device according to a first embodiment of the present invention.

A solid-state imaging device 100 includes a timing control circuit 200, row scan circuit 300, pixel array section 400, column scan circuit 500 and load current source circuit 600. The solid-state imaging device 100 further includes a signal readout circuit 710 and signal processing section 720.

The pixel array section 400 includes a plurality of pixel circuits 410 arranged in a two-dimensional matrix (n by m). Here, four pixel circuits (1,1), (1,2), (2,1) and (2,2) 410 are shown that are arranged in a two-by-two matrix for reasons of convenience. Further, horizontal line (HL) sets are arranged, one set in each row of the pixel circuits 410, and vertical signal lines VSL arranged, one in each column thereof. Here, two horizontal line sets in the first and second rows (HL1 and HL2) 301 and 302, and two vertical signal lines (VSL1 and VSL2) 501 and 502 in the first and second columns are shown.

On the other hand, the load current source circuit 600 includes a plurality of load current supply circuits 610 and reference transistor 690. The plurality of load current supply circuits 610 are provided one in each column of the pixel circuits 410. Each of the load current supply circuits 610 includes a setting transistor 611, holding capacitor 613, load transistor 614 and parasitic capacitor 619. Further, the signal readout circuit 710 includes a plurality of CDS (Correlated Double Sampling) circuits 711 and 712 arranged one in each column of the pixel circuits 410.

The horizontal line (HL1 and HL2) sets 301 and 302 are connected to the row scan circuit 300. On the other hand, the vertical signal lines (VSL1 and VSL2) 501 and 502 are connected to the CDS circuits 711 and 712 and the load current supply circuits 610 in the respective columns.

The timing control circuit 200 controls the timings for the image signal generation performed by the row scan circuit 300, column scan circuit 500, load current source circuit 600 and signal readout circuit 710. The timing control circuit 200 generates a timing control signal used to generate an image signal. The image signal is generated as the signals, output from the pixel circuits 410 of the pixel array section 400 on a row-by-row basis, are read out in the column direction. That is, the timing control circuit 200 controls the timings for the image signal generation using column parallel readout.

The timing control circuit 200 generates a timing control signal based on a clock signal supplied from a clock terminal 103 and a horizontal synchronizing signal supplied from a horizontal synchronizing terminal 102. Further, the timing control circuit 200 supplies a row address signal via an address line 201 and a timing signal via a timing line 202. The row address signal successively specifies the pixel circuits 410 on a row-by-row basis. The timing signal serves as a reference for the pulses supplied to the specified pixel circuits 410.

Still further, the timing control circuit 200 generates a maintenance control signal used to maintain the load current constant. The load current is used to read out the pixel signal from each of the pixel circuits 410. The timing control circuit 200 supplies the generated maintenance control signal to the load current source circuit 600 via a maintenance control signal line 203. Still further, the timing control circuit 200 generates a charge control signal used to charge the holding capacitors 613 immediately after power-on or standby reset. It should be noted that the timing control circuit 200 is an example of the control signal generation circuit described in the appended claims.

Still further, the timing control circuit 200 supplies readout pulses, one used to read out a reference signal and another used to read out a pixel signal output from each of the pixel circuits 410, to the signal readout circuit 710 via a reference signal readout control line 204 and pixel signal readout control line 205. Still further, the timing control circuit 200 supplies a column scan control signal used to control the column scan circuit 500 via a column scan control line 207. Still further, the timing control circuit 200 brings the solid-state imaging device 100 into a standby state based on a standby signal supplied from a standby terminal 101.

The row scan circuit 300 successively generates row scan signals based on a row address signal and timing signal supplied from the timing control circuit 200. The row scan signals are adapted to cause the pixel circuits 410 to output signals on a row-by-row basis. The row scan circuit 300 supplies the generated row scan signals to the horizontal line (HL) sets.

For example, the row scan circuit 300 supplies a row scan signal to the horizontal line (HL1) set 301 first, and then another to the horizontal line (HL2) set 302. The horizontal line (HL1 and HL2) sets 301 and 302 include reset potential lines 311 and 312, pixel reset lines 321 and 322 and charge transfer lines 331 and 332, respectively.

Each of the pixel circuits 410 converts incident light or optical signal into an electric signal through photoelectric conversion. The pixel circuit 410 amplifies the electric signal and outputs the amplified signal as a pixel signal. The pixel circuit 410 amplifies an electric signal, for example, using an FD amplifier having a floating diffusion (FD).

Each of the pixel circuits 410 includes a photoelectric conversion element 411, transfer transistor 412, reset transistor 413 and amplifying transistor 414. It should be noted that the pixel circuit 410 is an example of the pixel circuit described in the appended claims.

In the pixel circuit 410, the photoelectric conversion element 411 has its anode terminal grounded and its cathode terminal connected to the source terminal of the transfer transistor 412. Further, the transfer transistor 412 has its gate terminal connected to the charge transfer lines 331 and 332 and its drain terminal connected to the source terminal of the reset transistor 413 and the gate terminal of the amplifying transistor 414 via the floating diffusion FD.

Still further, the reset transistor 413 has its gate terminal connected to the pixel reset lines 321 and 322 and its drain terminal connected to the reset potential lines 311 and 312. Still further, the amplifying transistor 414 has its drain terminal connected to a power potential line 415 and its source terminal connected to the vertical signal line (VSL1 and VSL2) 501 and 502. Still further, the amplifying transistor 414 forms a source follower circuit together with the load transistor 614.

The photoelectric conversion element 411 generates electric charge according to the intensity of light. The photoelectric conversion element 411 is implemented, for example, by a photodiode and generates electrons according to the intensity of light.

The transfer transistor 412 transfers the electrons, generated by the photoelectric conversion element 411, to the floating diffusion FD according to a transfer pulse supplied from the row scan circuit 300. The transfer transistor 412 does so, for example, according to a transfer pulse supplied to its gate terminal via the charge transfer line 331.

The reset transistor 413 sets (charges) the floating diffusion FD to a constant potential according to a reset pulse supplied from the row scan circuit 300 so as to reset the potential of the floating diffusion FD. The reset transistor 413 does so, for example, by providing the reset potential, supplied via the reset potential line 311, to the gate terminal of the amplifying transistor 414 according to a reset pulse supplied from the pixel reset line 321.

The amplifying transistor 414 amplifies the potential generated in the floating diffusion FD and outputs a signal commensurate with the amplified potential to the vertical signal line (VSL) 501 or 502. The amplifying transistor 414 forms a source follower circuit together with the load transistor 614. That is, the amplifying transistor 414 amplifies the potential generated in the floating diffusion FD according to a load current supplied from the load transistor 614.

The amplifying transistor 414, for example, amplifies the potential generated in the floating diffusion FD using the reset potential and outputs the amplified reference potential to the vertical signal line (VSL1) 501 as a reference signal. This reference signal is used by the CDS circuit 711 or 712 to remove specific noise components such as reset noise of the reset transistor 413 and threshold voltage change of the amplifying transistor 414 from the pixel circuits 410.

Further, the amplifying transistor 414, for example, amplifies the potential generated as a result of the accumulation of the electrons, transferred from the transfer transistor 412, in the floating diffusion FD and outputs the amplified potential to the vertical signal line (VSL1) 501 as a pixel signal.

The column scan circuit 500 generates an output control signal based on a column scan control signal supplied from the timing control circuit 200. The output control signal causes the signal readout circuit 710 to output the pixel signals of each column to the signal processing section 720. The column scan circuit 500 supplies the generated output control signal to the CDS circuits 711 and 712.

A reference current generation circuit 680 is a constant current circuit adapted to generate a constant reference current using a power potential supplied via a power line 670. The reference current generation circuit 680 supplies the generated reference current to the load current source circuit 600 via a reference current line 601.

The load current source circuit 600 supplies a load current to the vertical signal lines (VSL1 and VSL2) 501 and 502 based on the reference current supplied from the reference current generation circuit 680. Each of the load current supply circuits 610 of the load current source circuit 600 supplies a constant load current to the vertical signal line (VSL1 or VSL2) 501 or 502.

In the load current supply circuit 610, the setting transistor 611 has its gate terminal connected to the maintenance control signal line 203 and its drain terminal connected to, the reference current line 601. Further, the holding capacitor 613 has one of its electrodes connected to the source terminal of the setting transistor 611 and the gate terminal of the load transistor 614 via the load transistor gate line 612 and its other electrode grounded. Still further, the load transistor 614 has its drain terminal connected to the vertical signal line (VSL1 or VSL2) 501 or 502 and its source terminal grounded. It should be noted that the setting transistor 611 and holding capacitor 613 form a so-called sample/hold circuit.

The setting transistor 611 is a switch adapted to switch between the presence and absence of contact between the load transistor gate line 612, connected to the gate terminal of the load transistor 614, and the reference current line 601, based on a maintenance control signal supplied from the timing control circuit 200. The setting transistor 611 stabilizes the gate voltage of the load transistor 614.

The setting transistor 611 conducts (turns on), for example, when a connection pulse is supplied from the timing control circuit 200, equalizing the potentials of the reference current line 601 and load transistor gate line.

On the other hand, the setting transistor 611 does not conduct (turns off), for example, when a maintenance control signal is supplied to its gate terminal, isolating the reference current line 601 from the load transistor gate line 612. This allows for the setting transistor 611 to stabilize the potential of the load transistor gate line 612 based on a maintenance control signal supplied from the timing control circuit 200. That is, the setting transistor 611 sets the holding capacitor 613 to a constant hold voltage based on the maintenance control signal.

Further, the setting transistor 611 connects the reference current line 601 and one end of the holding capacitor 613, for example, when the setting transistor 611 receives a charge control signal used to charge the holding capacitor 613, from the timing control circuit 200 immediately after power-on or standby reset. It should be noted that the setting transistor 611 is an example of the voltage setting circuit and setting transistor described in the appended claims.

The holding capacitor 613 maintains the gate voltage of the load transistor 614 constant so as to maintain the load current constant. The holding capacitor 613 holds the hold voltage set by the setting transistor 611. It should be noted that the holding capacitor 613 is an example of the voltage holding circuit and holding capacitor described in the appended claims.

The load transistor 614 forms a current mirror circuit together with the reference transistor 690. The load transistor 614 supplies a load current, commensurate with the reference current supplied to the reference transistor 690, to the vertical signal line (VSL1 or VSL2) 501 or 502. This allows for the levels of the reference and pixel signals to be output from the amplifying transistors 414 of the pixel circuits 410 to the vertical signal lines (VSL1 and VSL2) 501 and 502.

Further, the load transistor 614 forms a source follower circuit together with the amplifying transistors 414 to which the load transistor 614 is connected via the vertical signal line (VSL1 or VSL2) 501 or 502. The load transistor 614 supplies a load current to the vertical signal line (VSL1 or VSL2) 501 or 502. The load current is adapted to drive the amplifying transistors 414. That is, the load transistor 614 supplies a load current, commensurate with the voltage held by the holding capacitor 613, to the amplifying transistors 414. It should be noted that the load transistor 614 is an example of the load transistor described in the appended claims.

A parasitic capacitor 619 includes a parasitic capacitor generated between the gate and drain of the load transistor 614 and an interwire capacitor formed between the vertical signal line (VSL1 or VSL2) 501 or 502 and reference current line 601. This parasitic capacitor 619 produces coupling between the vertical signal line (VSL1 or VSL2) 501 or 502 and load transistor gate line 612 in each column. That is, the potential of the load transistor gate line 612 changes with change in the signal level of the vertical signal line (VSL1 or VSL2) 501 or 502.

The reference transistor 690 causes the load transistor 614 in each column to generate a load current that is approximately equal to the reference current (bias current) supplied from the reference current generation circuit 680. The reference transistor 690 ensures that a constant load current is supplied to the vertical signal line in each column from the load transistor 614. That is, the reference transistor 690 forms a current mirror circuit together with the load transistor 614 in each column.

Further, the reference transistor 690 has its source terminal grounded and its gate and drain terminals connected to the reference current line 601. That is, the reference transistor 690 sets a reference current through diode connection. It should be noted that the reference transistor 690 is an example of the reference transistor described in the appended claims.

The signal readout circuit 710 subjects the pixel signals output from the pixel array section 400 to correlated double sampling, thus removing fixed pattern noise caused by specific noise of each of the pixel circuits 410. The signal readout circuit 710 reads out the reference and pixel signals from the plurality of pixel circuits 410 on a row-by-row basis and outputs the difference between the reference and pixel signals that have been read out.

The CDS circuits 711 and 712 take the difference in level between the reference and pixel signals, successively supplied from the pixel circuits 410, removing fixed pattern noise such as reset noise and threshold voltage change of the amplifying transistor 414. The CDS circuits 711 and 712 read out the reference signals respectively from the vertical signal lines (VSL1 and VSL2) 501 and 502 to which the CDS circuits 711 and 712 are connected according to a readout pulse supplied via the reference signal readout control line 204. Further, the CDS circuits 711 and 712 read out the pixel signals respectively from the vertical signal lines (VSL1 and VSL2) 501 and 502 to which the CDS circuits 711 and 712 are connected according to a readout pulse supplied via the pixel signal readout control line 205.

The CDS circuits 711 and 712 supply the noise-free pixel signals to the signal processing section 720. It should be noted that the readout pulses supplied via the reference signal readout control line 204 and pixel signal readout control line 205 are supplied to all the CDS circuits via the CDS circuits 711 and 712.

The signal processing section 720 converts each of the pixel signals, i.e., analog signals, supplied from the CDS circuits 711 and 712, into a digital signal. The signal processing section 720 outputs the digital signal to a signal output line 721 as an image signal.

The setting transistor 611 and holding capacitor 613 provided in each of the load current supply circuits 610 suppress the change in level of the load transistor gate line 612. That is, the solid-state imaging device 100 can suppress the impact of coupling on the load transistor gate line 612 caused by the parasitic capacitor 619 resulting from the change in signal level of the vertical signal lines (VSL1 and VSL2).

Further, the solid-state imaging device 100 can remove the change in potential of the load transistor gate line 612 caused, for example, by the change in the reference current due to thermal noise of the reference transistor 690 that forms a current mirror circuit together with the load transistor 614. A detailed description will be given below of an example in which the change in potential of the load transistor gate line 612 caused, for example, by the change in the reference current due to thermal noise of the reference transistor 690 is removed, with reference to the timing diagrams.

[Operation Example of the Solid-State Imaging Device 100]

FIG. 2 is a timing diagram illustrating an operation example of the solid-state imaging device 100 according to the first embodiment of the present invention. This timing diagram shows the operation of the solid-state imaging device 100 during the readout period for the first row. We assume here that the vertical signal line (VSL) in each column changes in signal level only to a small extent, and that the impact of coupling on the load transistor gate line 612 caused by the parasitic capacitor 619 is slight.

Here, the changes in potential of the clock terminal 103, horizontal synchronizing terminal 102, address line 201, pixel reset line 321 and charge transfer line 331 are shown by solid lines, with the horizontal axis representing the time axis.

In addition to the above, the changes in potential of the reference signal readout control line 204, pixel signal readout control line 205 and maintenance control signal line 203 are also shown by solid lines.

Further, the load transistor gate line 872 in related art shows, by a dotted line, the change in potential of the signal line connected to the gate terminal of the load transistor in the load current source circuit in related art devoid of the setting transistor 611 and holding capacitor 613. On the other hand, we assume that the time elapses from left to right in this figure.

First at time t0, the horizontal synchronizing signal changes from high to low level at the horizontal synchronizing terminal 102, supplying a horizontal synchronizing pulse 112 to the timing control circuit 200. Further, a row address is supplied to the row scan circuit 300 from the timing control circuit 200 via the address line 201 to specify the pixel circuits 410.

At the same time, a reset pulse 320 is supplied to the pixel reset line 321 from the row scan circuit 300. This brings (turns) the reset transistor 413 into conduction (on), applying a reference potential to the floating diffusion FD thanks to a reset potential supplied from the reset potential line 311.

Further at time t0, a connection pulse 213 is supplied to the maintenance control signal line 203 from the timing control circuit 200. This turns on the setting transistor 611, connecting the reference current line 601 and load transistor gate line 612. As a result, the potential of the load transistor gate line 612 is equalized to that of the reference current line 601 which varies due, for example, to thermal noise of the reference transistor 690. That is, the load transistor gate line 612 shows a waveform similar to that of the load transistor gate line 872 in related art during the connection period.

Then at time t1, the connection period of the connection pulse ends in the maintenance control signal line 203, changing the pixel reset line 321 from high to low level. That is, a maintenance control signal is supplied to the maintenance control signal line 203 from the timing control circuit 200.

This brings (turns) the setting transistor 611 out of conduction (off), stabilizing the voltage held by the holding capacitor 613 and thereby maintaining the potential of the load transistor gate line 612 constant. That is, the holding capacitor 613 is set to a constant hold voltage based on the maintenance control signal. As described above, the gate voltage of the load transistor 614 is stabilized, maintaining constant the load current supplied to the pixel circuits 410 from the load transistor 614. The reset pulse 320 supplied from the row scan circuit 300 is reset thereafter.

Next at time t2, a readout pulse 214 is supplied to the signal readout circuit 710 from the timing control circuit 200 via the reference signal readout control line 204, initiating a reference signal readout period. This allows for the signal readout circuit 710 to read out a reference signal output from the amplifying transistor 414 of the pixel circuit 410.

At this time, the potential of the load transistor gate line 612 is constant. As a result, the load current supplied to the amplifying transistor 414 is maintained constant. This allows for the signal readout circuit 710 to read out the reference signal output at a constant amplification gain from the amplifying transistor 414. In contrast, the potential of the load transistor gate line 872 in related art changes. As a result, the amplification gain of the amplifying transistor 414 changes.

At time t3 following the end of the reference signal readout period, a transfer pulse 330 is supplied to the transfer transistor 412 from the row scan circuit 300 via the charge transfer line 331. This turns on the transfer transistor 412, transferring the electrons, generated by the photoelectric conversion element 411, to the floating diffusion FD.

At time t4 thereafter, a readout pulse 215 is supplied to the signal readout circuit 710 from the timing control circuit 200 via the pixel signal readout control line 205. This allows for the signal readout circuit 710 to read out the pixel signal output from the amplifying transistor 414 to the vertical signal line based on the potential produced by the electrons transferred to the floating diffusion FD from the amplifying transistor 414. Then, the signal readout circuit 710 calculates the difference between the reference and pixel signals read out via the vertical signal line through correlated double sampling, supplying the noise-free pixel signal to the signal processing section 720.

At this time, the potential of the load transistor gate line 612 is equal to that during the reference signal readout period, maintaining constant the load current supplied to the amplifying transistor 414. Therefore, in the holding period, the reference and pixel signals output from the amplifying transistor 414 at a constant amplification gain are read out by the signal readout circuit 710.

In contrast, the potential of the load transistor gate line 872 in related art changes, changing the amplification gain of the amplifying transistor 414. It should be noted that the period from time t1 to time t5 is shown here as a holding period. However, it is only necessary to maintain the load current constant during the readout period from the reference signal readout period to the pixel signal readout period. Therefore, the period from time t2 to time t5 may be considered a holding period.

Then at time t5, a horizontal synchronizing pulse 112 is supplied to the horizontal synchronizing terminal 102, terminating the one row readout period for the first row and initiating the one row readout period for the second row.

As described above, the solid-state imaging device 100 reads out the reference and pixel signals output from the pixel circuit 410 during the one row readout period of the correlated double sampling performed by the signal readout circuit 710. In this case, the potential of the load transistor gate line 872 in related art changes due, for example, to thermal noise of the reference transistor 690. This changes the amplification gain of the amplifying transistor 414, causing the impact of thermal noise and other factors to be superposed on the pixel signal as a noise component.

In contrast, the solid-state imaging device 100 turns off the setting transistor 611 during the holding period of the one row readout period based on a maintenance control signal supplied from the maintenance control signal line 203. That is, the timing control circuit 200 generates a maintenance control signal. The maintenance control signal is adapted to maintain the load current constant during a readout period that lasts from when a reference signal is read out on a row-by-row basis by the signal readout circuit 710 to when a pixel signal is read out on a row-by-row basis by the signal readout circuit 710.

This allows for a constant hold voltage to be held by the holding capacitor 613 during the holding period, stabilizing the potential of the load transistor gate line 612 and eliminating the impact of thermal noise of the reference transistor 690 and other factors.

As described above, the setting transistor 611 sets the holding capacitor 613 to a hold voltage in the first embodiment of the present invention, stabilizing the potential of the load transistor gate line 612. This maintains the magnitude of the load current supplied from the load transistor 614 during reference and pixel signal readout periods constant. As a result, it is possible to suppress the impact of coupling of the vertical signal lines 501 and 502 caused by the parasitic capacitor 619 and eliminate the impact of thermal noise of the reference transistor 690 and other factors.

It should be noted that a description has been given of an example in which a connection period is provided during a one row readout period. In this case, however, the holding capacitor 613 may not be charged sufficiently during a connection period alone immediately after power-on or recovery from a standby state of the solid-state imaging device 100. Therefore, a description will be given below of an example in which a charge period is provided to charge the holding capacitor 613 immediately after power-on or recovery from a standby state with reference to the accompanying drawing.
[Modification Example of the Operation of the Solid-State Imaging Device 100]

Figure 3:
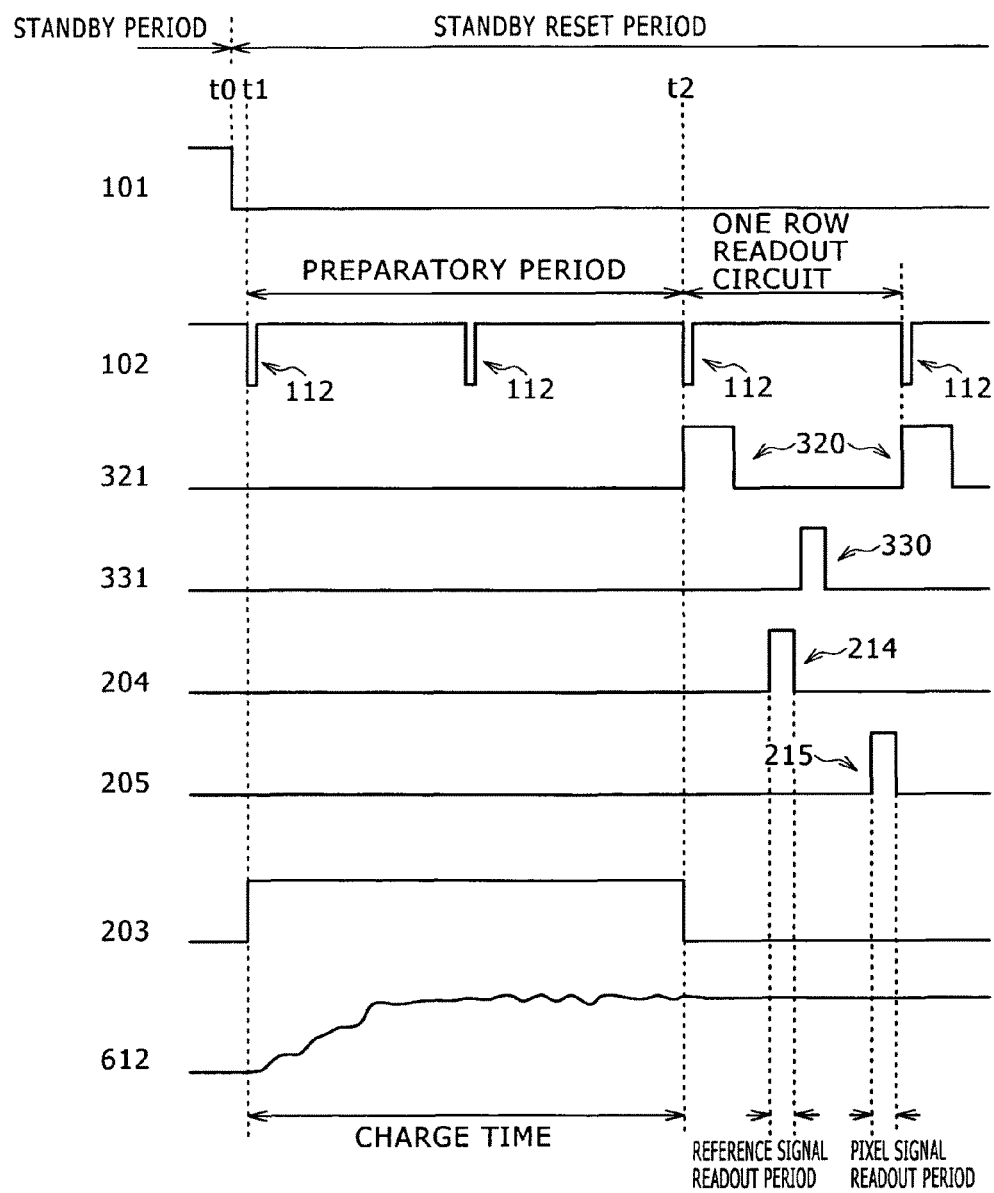
FIG. 3 is a timing diagram illustrating a modification example of the solid-state imaging device according to the first embodiment of the present invention.

FIG. 3 is a timing diagram illustrating a modification example of the operation of the solid-state imaging device 100 according to the first embodiment of the present invention. In this example, we assume that the solid-state imaging device 100 recovers from a standby state.

Here, the changes in potential of the standby terminal 101, horizontal synchronizing terminal 102, pixel reset line 321, charge transfer line 331, reference signal readout control line 204, pixel signal readout control line 205, maintenance control signal line 203 and load transistor gate line 612 are shown. On the other hand, we assume that the time elapses from left to right in this figure, with the horizontal axis representing a common time axis.

First prior to time t0, a standby signal is supplied to the timing control circuit 200 from the standby terminal 101. As a result, the solid-state imaging device 100 is in a standby state. At time t0, the signal from the standby terminal 101 changes from high to low level, resetting the standby period.

Then at time t1, the horizontal synchronizing pulse 112 is supplied to the horizontal synchronizing terminal 102, initiating a preparatory period. At the same time, the signal supplied from the timing control circuit 200 via the maintenance control signal line 203 changes from low to high level, initiating a charge period of the holding capacitor 613.

This supplies a charge control signal to the gate terminal of the setting transistor 611 via the maintenance control signal line 203, turning on the setting transistor 611 and starting to charge the holding capacitor 613. That is, the holding capacitor 613 begins to be charged.

Next at time t2, the horizontal synchronizing pulse 112 is supplied to the horizontal synchronizing terminal 102, terminating the preparatory period and initiating a one row readout period. At this time, the signal supplied from the timing control circuit 200 via the maintenance control signal line 203 changes from high to low level, terminating the charge period. As a result, a maintenance control signal is supplied to the setting transistor 611 via the maintenance control signal line 203, turning off the setting transistor 611 and stabilizing the potential of the load transistor gate line 612.

From time t2 onward, the holding capacitor 613 is not set again to a hold voltage by the connection pulse shown in FIG. 2, maintaining the potential of the load transistor gate line 612 constant. Further, the maintenance control signal line 203 and load transistor gate line 612 change in potential in the same manner as for the operation of the solid-state imaging device 100 shown in FIG. 2. Therefore, the description thereof is omitted.

As described above, the timing control circuit 200 generates a charge control signal during a preparatory period prior to the start of a one row readout period. This permits connection of the gate terminal of the reference transistor 690 associated with the load transistor 614 to one end of the holding capacitor 613. That is, if a preparatory period, equivalent in length to two one row readout periods, is provided, the holding capacitor 613 can be sufficiently charged during a charge period. This eliminates the likelihood of the holding capacitor 613 being insufficiently charged immediately after the solid-state imaging device 100 is activated. As a result, it is possible to prevent the degradation of the response characteristics of the signals output to the vertical signal lines from the pixel circuits 410. The degradation is caused by the decline in load current resulting from the insufficiently charged holding capacitor 613.

It should be noted that, in this case, the holding capacitor 613 is not set again to a hold voltage. Therefore, it is likely that the load transistor gate line 612 may decline in potential for extended periods due to a gate leak current of the load transistor 614 and a leak current of the holding capacitor 613. However, such a long-term decline is likely suppressed by a channel leak current to the load transistor gate line 612 from the setting transistor 611.

It should be noted that the change in potential caused by the parasitic capacitor 619 does not last long because a constant reference signal is output to each of the vertical signal lines (VSL1 and VSL2) 501 and 502 from the pixel circuits 410 every one row readout period. On the other hand, although an example has been described here in which the length of the charge period is set to two one row readout periods, the length thereof may be set to a one row readout period, three one row readout periods or longer according to the magnitude of the capacitance of the holding capacitor 613.

On the other hand, although capable of suppressing the impact of coupling caused by the change in potential of a vertical signal line in other column, the first embodiment of the present invention may not be able to suppress the impact of coupling caused by the change in potential of the vertical signal line to which the load transistor 614 is connected. For example, the impact of coupling resulting from the change in signal level of the vertical signal line (VSL1) 501 on the load transistor gate line 612 associated with that vertical signal line (VSL1) 501 may not be sufficiently suppressed. A second embodiment is an improved version of the first embodiment to lessen the impact of coupling resulting from the change in level of a vertical signal line on the load transistor gate line 612 associated with the vertical signal line.

2. Second Embodiment

Configuration Example of the Solid-State Imaging Device

Figure 4:
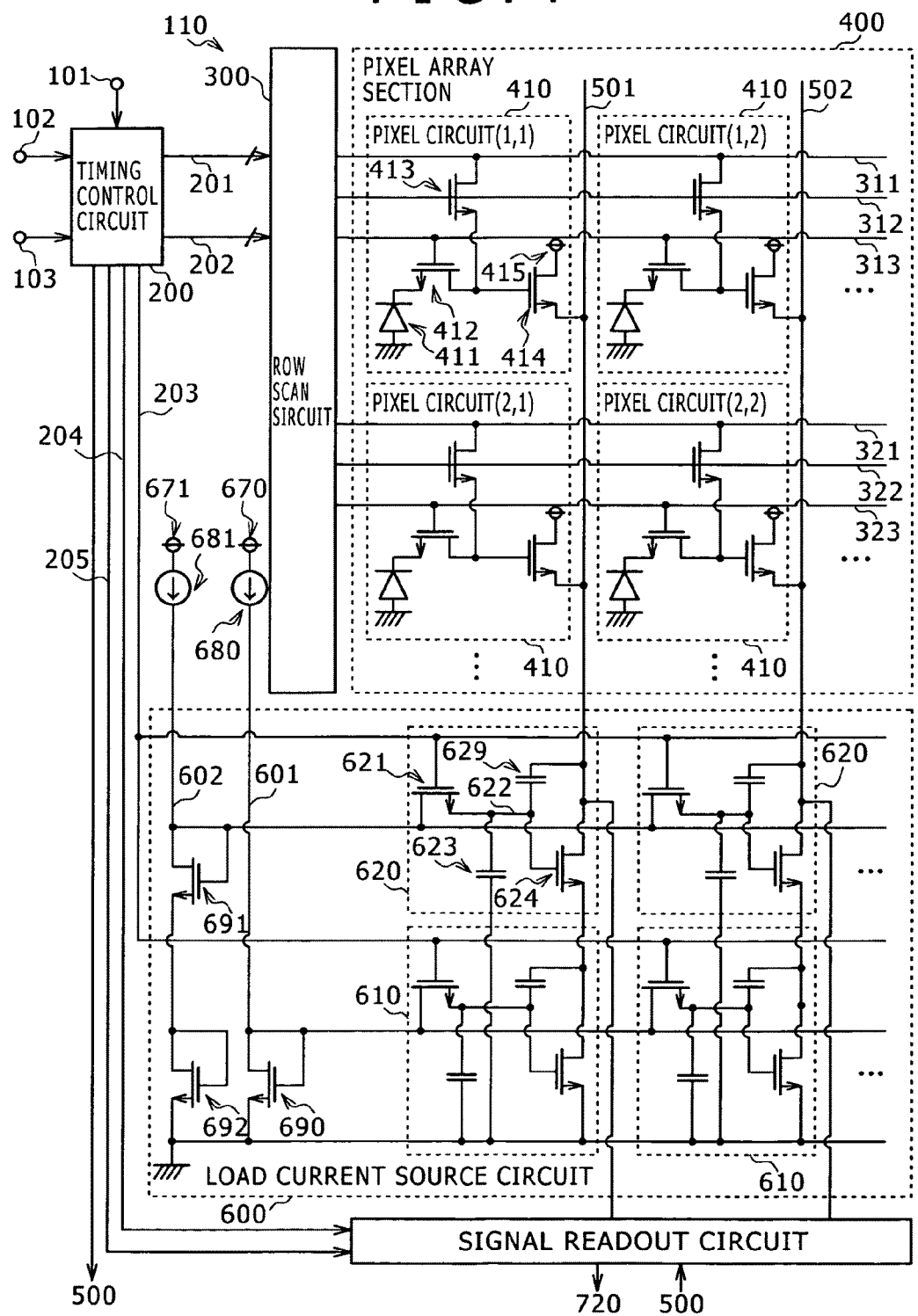
FIG. 4 is a circuit diagram illustrating a configuration example of a solid-state imaging device according to a second embodiment of the present invention.

FIG. 4 is a circuit diagram illustrating a configuration example of a solid-state imaging device according to a second embodiment of the present invention. In addition to the components of the solid-state imaging device 100 shown in FIG. 1, a solid-state imaging device 110 includes second load current supply circuits 620, reference current generation circuit 681 and reference transistors 691 and 692. That is, the solid-state imaging device 110 includes two stages of the load current supply circuits in the load current source circuit 600, i.e., the load current supply circuits 610 and 620, that are cascoded (cascaded) together.

In this example, the components other than the second load current supply circuit 620, reference current generation circuit 681 and reference transistors 691 and 692, are the same as those of the solid-state imaging device 100 shown in FIG. 1. Therefore, these components are denoted by the same reference numerals, and the description thereof is omitted. On the other hand, the reference current generation circuit 681 and reference transistors 691 and 692 form a current mirror circuit together with the second load current supply circuit 620. Further, the reference current generation circuit 681 is the same as the reference current generation circuit 680, and each of the reference transistors 691 and 692 is the same as the reference transistor 690. Therefore, the description thereof is omitted.

A second setting transistor 621, second holding capacitor 623, second load transistor 624 and parasitic capacitor 629 are shown in each of the second load current supply circuits 620. The second load current supply circuit 620 is configured in the same manner as the load current supply circuit 610. Therefore, the detailed description thereof is omitted.

In the second load current supply circuit 620, the second setting transistor 621 has its gate terminal connected to the maintenance control signal line 203 and its drain terminal connected to a second reference current line 602. On the other hand, the second load transistor 624 has its drain terminal connected to the vertical signal line (VSL1 or VSL2) 501 or 502 and its source terminal connected to the drain terminal of the load transistor 614.

Further, the second holding capacitor 623 has one of its electrodes connected to the source terminal of the second setting transistor 621 and the gate terminal of the second load transistor 624 via a second load transistor gate line 622 and its other electrode grounded. It should be noted that the parasitic capacitor 629 is formed between the second load transistor gate line 622 and the drain terminal of the second load transistor 624.

The second load transistor 624 forms a current mirror circuit together with the reference transistor 691. The second load transistor 624 supplies a load current, commensurate with the reference current flowing through the reference transistor 691, to the vertical signal line (VSL1 or VSL2) 501 or 502. This allows for the levels of the reference and pixel signals to be output from the amplifying transistors 414 of the pixel circuits 410 to the vertical signal lines (VSL1 and VSL2) 501 and 502.

Further, the second load transistor 624 forms a source follower circuit together with the amplifying transistors 414 and load transistor 614 that are connected via the vertical signal line (VSL1 or VSL2) 501 or 502. This allows for the second load transistor 624 to supply a load current, commensurate with the voltage held by the second holding capacitor 623, to the amplifying transistors 414. It should be noted that the second load transistor 624 is an example of the second load transistor described in the appended claims.

The second setting transistor 621 is a switch adapted to switch between the presence and absence of contact between the load transistor gate line 622, connected to the gate terminal of the second load transistor 624, and the reference current line 601, based on a maintenance control signal supplied from the timing control circuit 200. The second setting transistor 621 is associated with the second load transistor 624. The second setting transistor 621 sets the second holding capacitor 623 to a constant hold voltage. It should be noted that the second setting transistor 621 is an example of the second voltage setting circuit described in the appended claims.

The second holding capacitor 623 maintains the gate voltage of the second load transistor 624 constant. The second holding capacitor 623 is associated with the second load transistor 624. The second holding capacitor 623 maintains the gate voltage of the second load transistor 624 constant. It should be noted that the second holding capacitor 623 is an example of the second voltage holding circuit described in the appended claims.

The parasitic capacitor 629 includes a parasitic capacitor generated between the gate and drain of the second load transistor 624 and an interwire capacitor formed between the vertical signal line (VSL1 or VSL2) 501 or 502 and second reference current line 602. This parasitic capacitor 629 produces coupling between the vertical signal line (VSL1 or VSL2) 501 or 502 and load transistor gate line 622. That is, the potential of the load transistor gate line 612 changes with change in the signal level of the vertical signal line (VSL1 or VSL2) 501 or 502.

As described above, the second load current supply circuit 620 is provided in the second embodiment, lessening the impact of coupling resulting from the change in level of a vertical signal line on the load transistor gate line 612 associated with the vertical signal line.

Further, the second setting transistor 621 and second holding capacitor 623 can lessen the impact of coupling resulting from the change in level of other vertical signal line on the load transistor gate line 612. For example, the second setting transistor 621 and second holding capacitor 623 associated with the vertical signal line (VSL1) 501 lessen the impact of coupling resulting from the change in signal level of a vertical signal line other than the vertical signal line (VSL1) 501. A description will be given here of an example in which the load transistor gate line 612 changes in potential as a result of the provision of the second load current supply circuit 620 with reference to the accompanying drawing.

[Example of Potential Change of the Load Transistor Gate Line 612]

Figure 5:
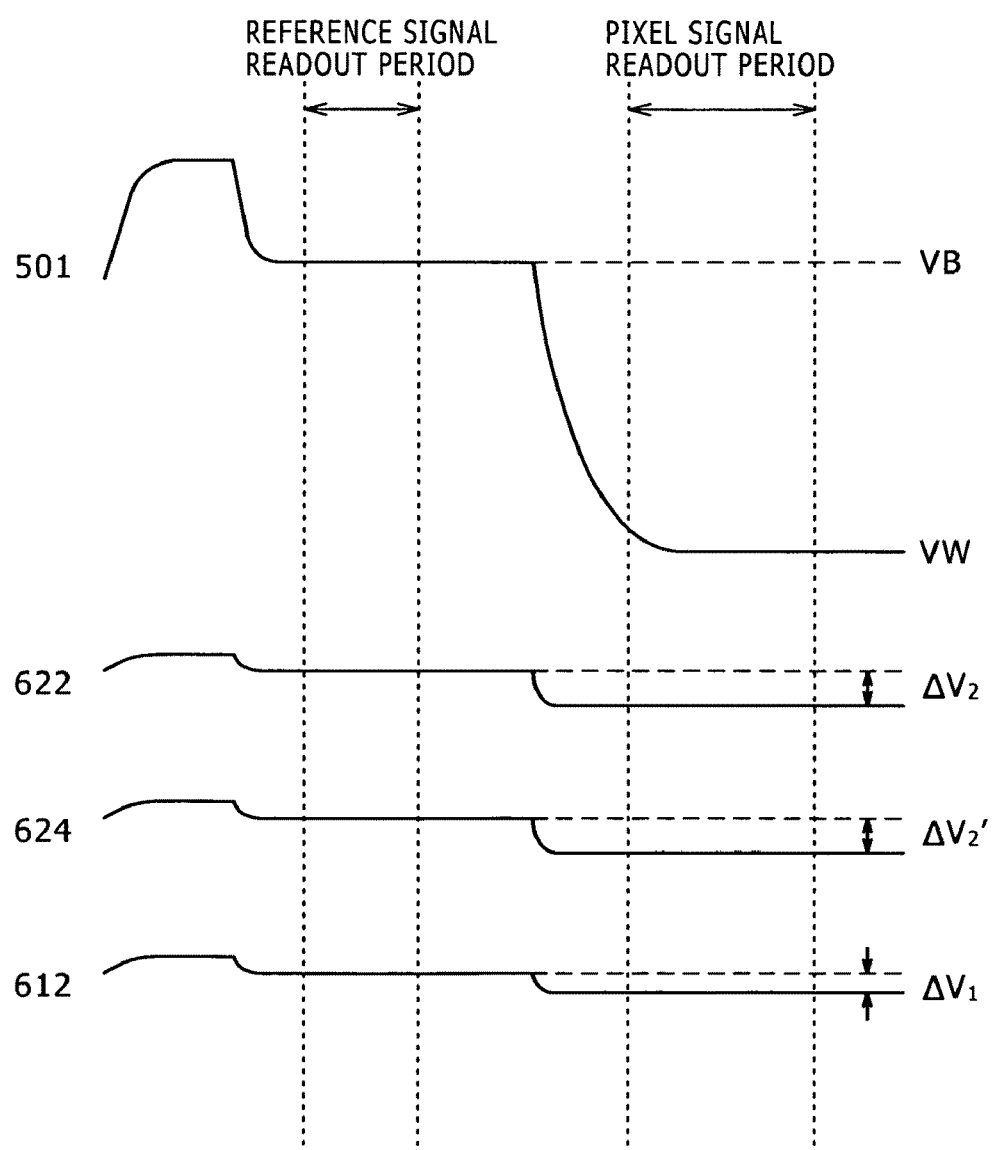
FIG. 5 is a conceptual diagram illustrating an example of impact of coupling on a load transistor gate line according to the second embodiment of the present invention.

FIG. 5 is a conceptual diagram illustrating an example of impact of coupling on the load transistor gate line 612 according to the second embodiment of the present invention. We assume here that white light is received by the pixel circuit 410 connected to the vertical signal line (VSL1) 501.

In this example, the changes in potential of the vertical signal line (VSL1) 501, second load transistor gate line 622, source terminal of the second load transistor 624 and load transistor gate line 612 during a one row readout period are shown. On the other hand, the reference signal readout period and pixel signal readout period are respectively the periods during which the reference signal and pixel signal are read out by the signal readout circuit 710, as with FIG. 4.

The vertical signal line (VSL1) 501 shows the signal level output from the pixel circuit 410 as a result of the pixel circuit 410 receiving white light. The potential of the vertical signal line (VSL1) 501 drops from the black potential (VB) during a reference signal readout period to the white potential (VW) during a pixel signal readout period. That is, the signal level of the vertical signal line (VSL1) 501 changes significantly.

The second load transistor gate line 622 shows the potential change of the gate terminal of the second load transistor 624. As a result of the decline in level of the vertical signal line (VSL1) 501, the potential of the second load transistor gate line 622 drops from the potential during a reference signal readout period by a second coupling change ($\Delta V_2$) that is based on the voltage division ratio between the second holding capacitor 623 and parasitic capacitor 629. That is, the second coupling change ($\Delta V_2$) is generated based on the decline in level (VB-VW) of the vertical signal line (VSL1) 501 and the ratio of the second holding capacitor 623 relative to the combined capacitance of the second holding capacitor 623 and parasitic capacitor 629.

It should be noted that, in the first embodiment, the amplification gain of the amplifying transistors 414 connected to the vertical signal line (VSL1) 501 increases due to the second coupling change ($\Delta V_2$) during a pixel signal readout period.

The source terminal of the second load transistor 624 shows the potential change of the source terminal of the second load transistor 624. The second coupling change ($\Delta V_2$) propagates to the source terminal of the second load transistor 624 from the second load transistor gate line 622, resulting in a potential drop ($\Delta V_2'$) approximately equal to the second coupling change ($\Delta V_2$).

The load transistor gate line 612 shows the potential change of the gate terminal of the load transistor 614. As a result of the potential drop ($\Delta V_2'$) of the source terminal of the second load transistor 624, the potential of the load transistor gate line 612 drops from the potential during a reference signal readout period by a first coupling change ($\Delta V_1$) that is based on the voltage division ratio between the first holding capacitor 613 and parasitic capacitor 619.

As described above, if the second load current supply circuit 620 is provided, the change in signal level of the vertical signal line (VSL1) 501 can be suppressed to that based on the voltage division ratio between the second holding capacitor 623 and parasitic capacitor 629. This suppresses the change of the gate terminal of the load transistor 614 to that based on the voltage division ratio between the holding capacitor 613 and parasitic capacitor 619, making the impact of coupling negligibly small. For example, if the voltage division ratio is set to 1/10 for both the load current supply circuit 610 and second load current supply circuit 620, the coupling change of the load transistor gate line 612 can be suppressed to 1/10 that of the solid-state imaging device 100 shown in FIG. 1.

As described above, the second load current supply circuit 620 is provided in the second embodiment, suppressing the impact of coupling resulting from the change in signal level of the own vertical signal line more than in the first embodiment. That is, the second embodiment can suppress the change in potential of the load transistor gate line 612 associated with a vertical signal line resulting from the change in signal level of that vertical signal line.

It should be noted that examples have been described in the first and second embodiments in which the setting transistors 611 and holding capacitors 613 are provided one each for each column of the pixel circuits 410. However, the numbers of the setting transistors 611 and holding capacitors 613 may be reduced. A description will be given here of an example of a solid-state imaging device 120 that includes the single setting transistor 611 and single holding capacitor 613 with reference to the accompanying drawing.

3. Third Embodiment

Configuration Example of the Solid-State Imaging Device 120

Figure 6:
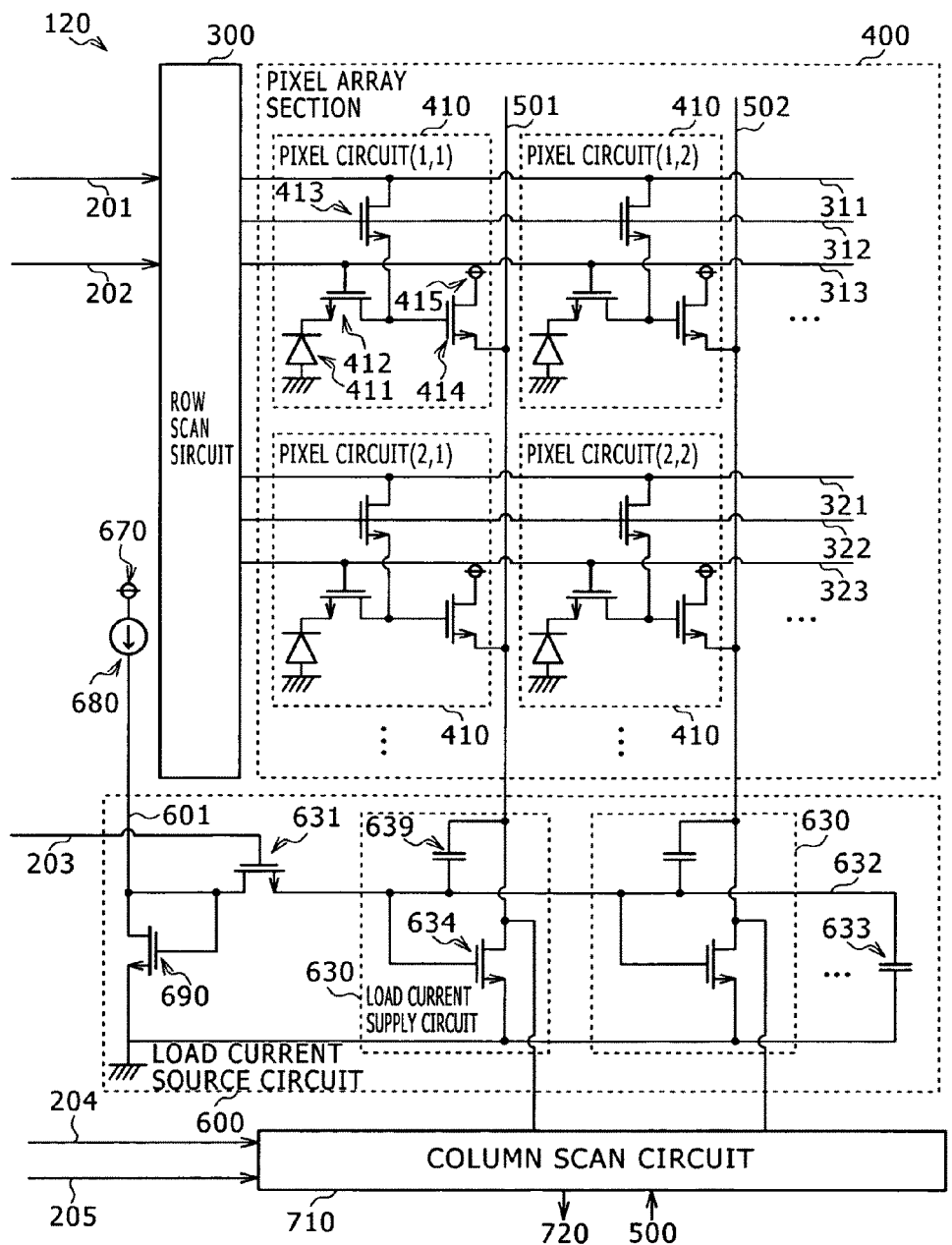
FIG. 6 is a circuit diagram illustrating a configuration example of a solid-state imaging device according to a third embodiment of the present invention.

FIG. 6 is a circuit diagram illustrating a configuration example of a solid-state imaging device 120 according to a third embodiment of the present invention. The solid-state imaging device 120 includes load current supply circuits 630, voltage setting circuit 631 and voltage holding circuit 633 rather than the load current supply circuits 610 of the load current source circuit 600 shown in FIG. 1. It should be noted that the timing control circuit 200, column scan circuit 500 and signal processing section 720 shown in FIG. 1 are omitted here for reasons of convenience.

A load transistor 634 and parasitic capacitor 639 are shown in each of the load current supply circuits 630. The load transistor 634 and parasitic capacitor 639 are the same as the load transistor 614 and parasitic capacitor 619 shown in FIG. 1, respectively. Therefore, the description thereof is omitted.

It should be noted that the load current supply circuits 630 is configured in the same manner as the load current supply circuit of the solid-state imaging device in related art.

The voltage setting circuit 631 is a switch adapted to stabilize the potential of a load transistor gate line 632 connected to the gate terminal of the load transistor 634 based on a maintenance control signal supplied from the timing control circuit 200 via the maintenance control signal line 203. The voltage setting circuit 631 connects the reference current line 601 on its drain side and the load transistor gate line 632 on its source side together based on a maintenance control signal supplied from the timing control circuit 200. On the other hand, the voltage setting circuit 631 is associated with the setting transistor 611 shown in FIG. 1.

The voltage setting circuit 631 is implemented, for example, by a field effect transistor. Further, when a maintenance control signal is supplied to its gate terminal, the voltage setting circuit 631 turns off, isolating the reference current line 601 from the load transistor gate line 632. This allows for the voltage setting circuit 631 to stabilize the potential of the load transistor gate line 632 based on the maintenance control signal supplied from the timing control circuit 200. That is, the voltage setting circuit 631 sets the voltage holding circuit 633 to a constant hold voltage based on the maintenance control signal.

Further, the voltage setting circuit 631 connects the reference current line 601 and one end of the voltage holding circuit 633, for example, when the voltage setting circuit 631 receives a charge control signal, used to charge the voltage holding circuit 633, from the timing control circuit 200 immediately after power-on or standby reset. It should be noted that the voltage setting circuit 631 is an example of the voltage setting circuit described in the appended claims.

The voltage holding circuit 633 is a capacitor adapted to maintain the gate voltage of the load transistor 634 constant. The voltage holding circuit 633 has a capacitance large enough to suppress the impact of coupling of the vertical signal lines (VSL1 and VSL2) 501 and 502 caused by the parasitic capacitor 639 that takes place on a column-by-column basis.

As described above, if the voltage holding circuit 633 has a capacitance large enough to suppress the impact of coupling caused by the parasitic capacitor 639, the load current source circuit 600 can be implemented with the single voltage setting circuit 631 and single voltage holding circuit 633. A description will be given next of an operation example of the solid-state imaging device 120 with reference to the accompanying drawing.

[Operation Example of the Solid-State Imaging Device 120]

Figure 7:
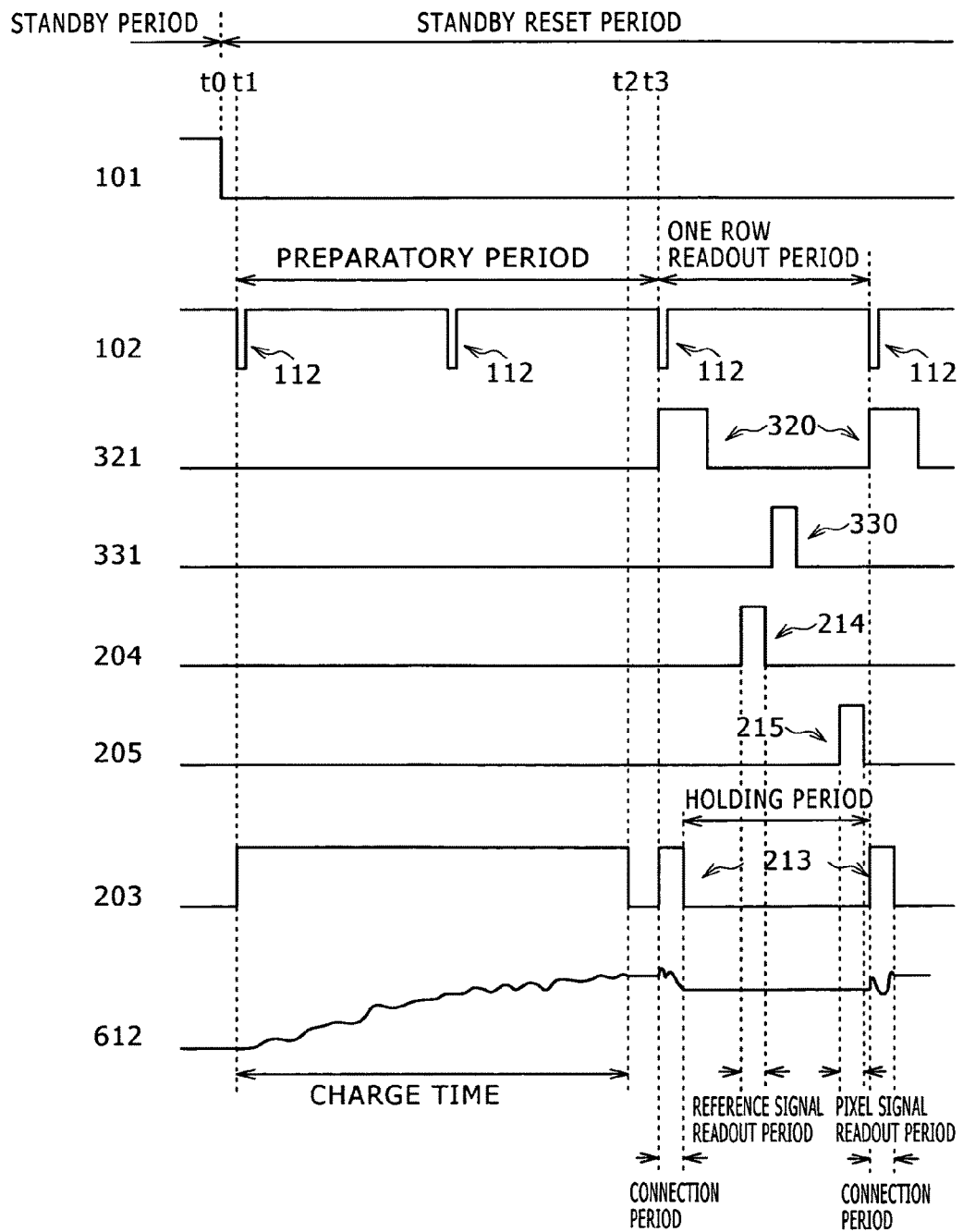
FIG. 7 is a timing diagram illustrating an operation example of the solid-state imaging device according to the third embodiment of the present invention.
Figure 8:
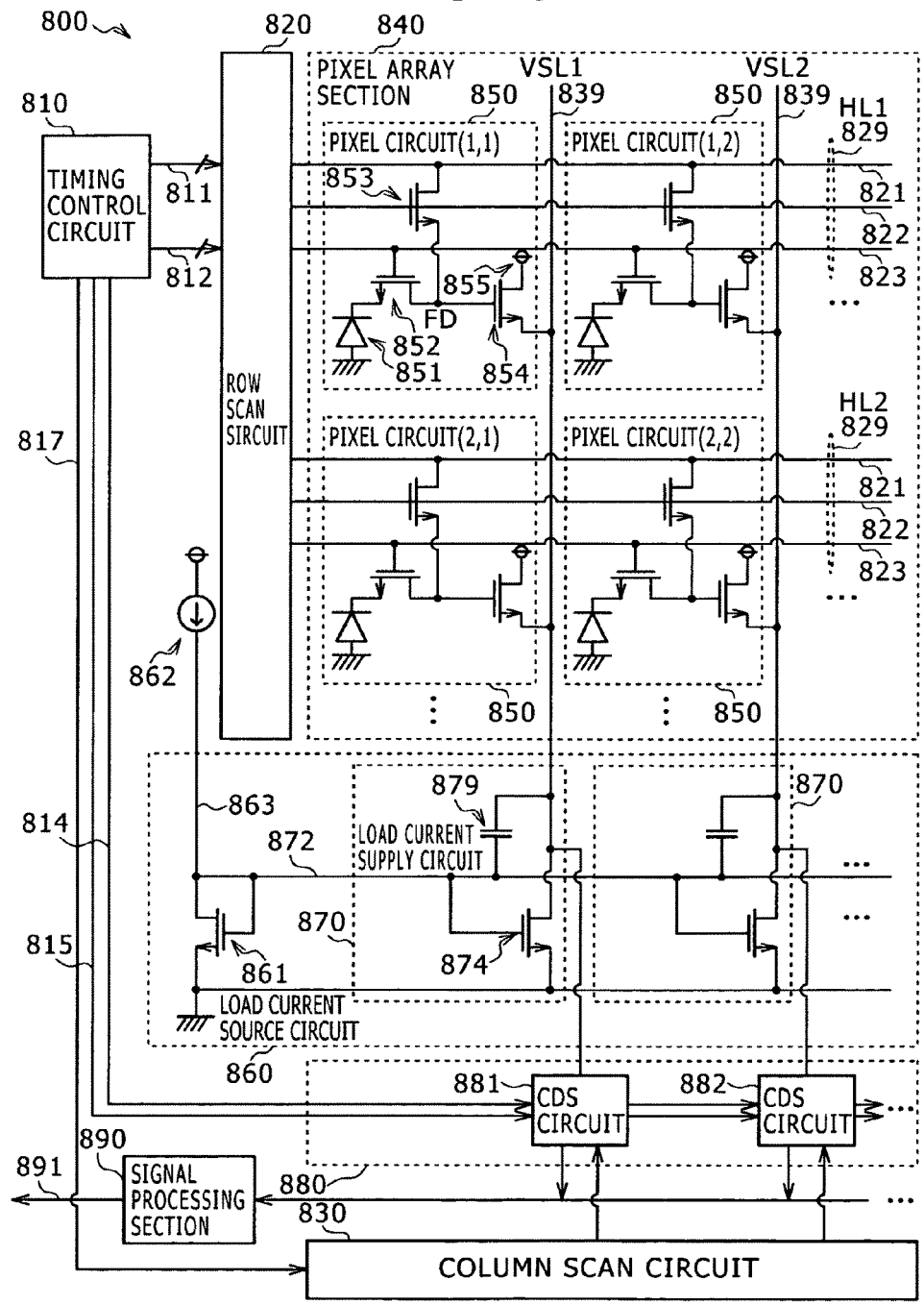
FIG. 8 is a circuit diagram illustrating a configuration example of a solid-state imaging device in related art.
Figure 9A:
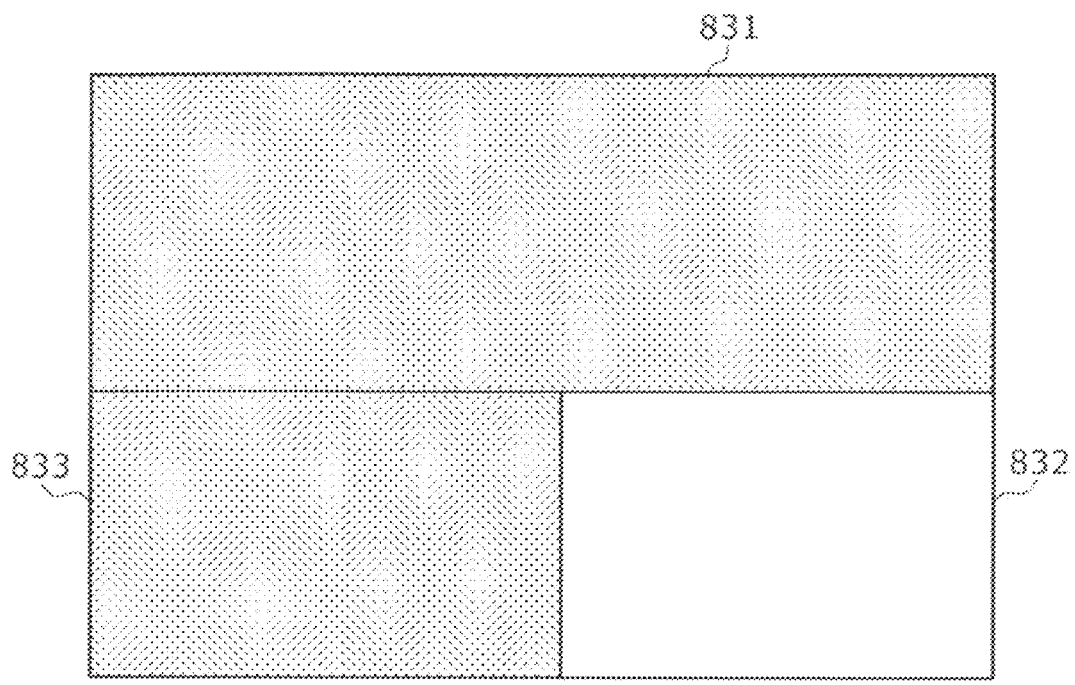
FIGS. 9A and 9B are conceptual diagrams illustrating captured images affected by coupling that takes place as a result of the change in signal level of the vertical signal line via a parasitic capacitor in a solid-state imaging device in related art.
Figure 9B:
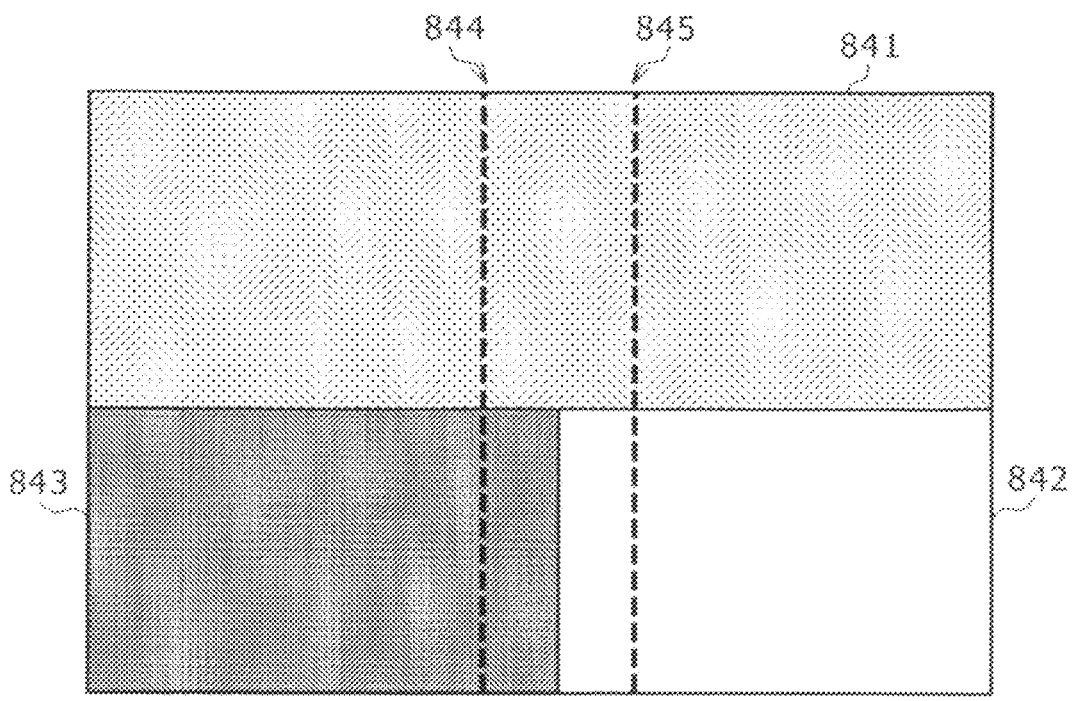
Figure 10:
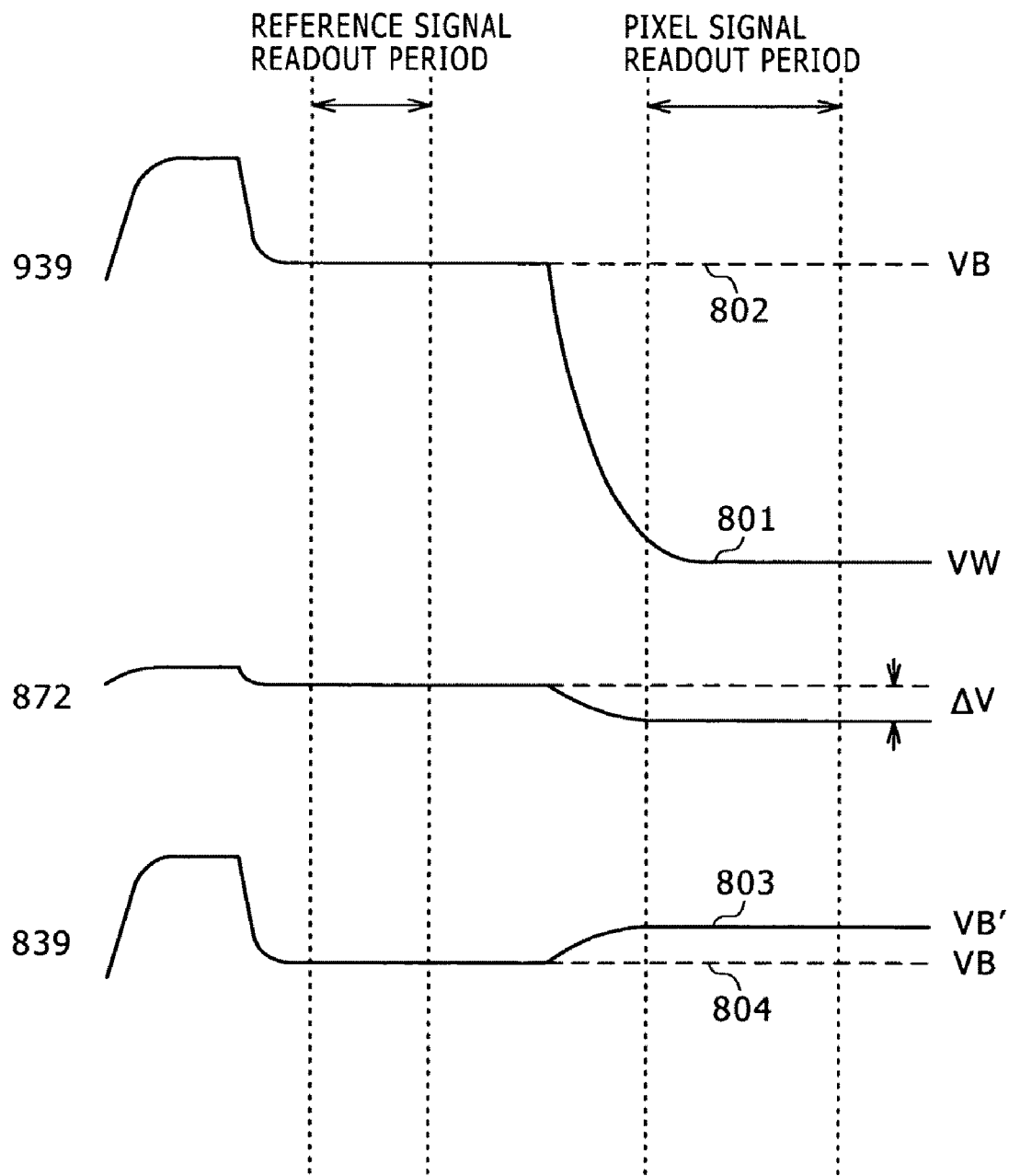
FIG. 10 is a diagram illustrating the cause of why the captured image shown in FIG. 9B is produced by the solid-state imaging device in related art.

FIG. 7 is a timing diagram illustrating an operation example of the solid-state imaging device 120 according to the third embodiment of the present invention. Here, the changes in potential of the standby terminal 101, horizontal synchronizing terminal 102, pixel reset line 321, charge transfer line 331, reference signal readout control line 204, pixel signal readout control line 205, maintenance control signal line 203 and load transistor gate line 612 are shown. In this example, on the other hand, we assume that the solid-state imaging device 120 recovers from a standby state. We assume here that the time elapses from left to right in this figure, with the horizontal axis representing a common time axis.

First prior to time to, a standby signal is supplied to the timing control circuit 200 from the standby terminal 101. As a result, the solid-state imaging device 120 is in a standby state. At time t0, the signal from the standby terminal 101 changes from high to low level, resetting the standby period.

Next at time t1, the horizontal synchronizing pulse 112 is supplied to the horizontal synchronizing terminal 102, initiating a preparatory period, i.e., a period for recovery from a standby state. At this time, the signal supplied from the timing control circuit 200 via the maintenance control signal line 203 changes from low to high level, initiating a charge period of the voltage holding capacitor 633.

That is, the voltage setting circuit 631 turns on based on the charge control signal supplied via the maintenance control signal line 203, accumulating electric charge in the voltage holding circuit 633 and thereby initiating the charge of the voltage holding circuit 633. The potential of the load transistor gate line 612 increases gradually because the capacitance of the voltage holding circuit 633 is larger than that of the holding capacitor 613 provided in each column.

At time t2 thereafter, the signal supplied from the timing control circuit 200 via the maintenance control signal line 203 changes from high to low level, terminating the charge period. That is, the voltage setting circuit 631 turns off when a maintenance control signal is supplied to the voltage setting circuit 631 via the maintenance control signal line 203, stabilizing the potential of the load transistor gate line 612.

Next at time t3, the horizontal synchronizing pulse 112 is supplied to the horizontal synchronizing terminal 102, terminating the preparatory period and initiating a one row readout period. At the same time, the connection pulse 213 is supplied via the maintenance control signal line 203, initiating a connection period. It should be noted that the operation from time t3 onward is the same as that of the solid-state imaging device 100 shown in FIG. 2. Therefore, the description thereof is omitted.

As described above, if a preparatory period, equivalent in length to two one row readout periods, is provided, it is possible to eliminate the likelihood of the voltage holding circuit 633 with a relatively large capacitance being insufficiently charged. This makes it possible for the signal readout circuit 710 to read the signals, amplified to appropriate levels, from the pixel circuits 410 during a first one row readout period of a standby reset period.

As described above, the single voltage setting circuit 631 and single voltage holding circuit 633 are provided in the third embodiment of the present invention, unlike in the first or second embodiment, providing a reduced number of components of the load current source circuit 600.

As described above, the preferred embodiments of the present invention can suppress the change in gate voltages of the load transistors 614 attributable to the impact of coupling caused, for example, by thermal noise of the reference transistor 690 and the parasitic capacitor 619. That is, the load current source circuit 600 can stabilize the load current supplied to the vertical signal line connected to each column of the pixel circuits 410 during a readout period that lasts from a reference signal readout period to a pixel signal readout period.

It should be noted that a capacitor may be provided outside the solid-state imaging device to stabilize the load current. In this case, however, an external connection terminal is required, thus requiring a space for that purpose, which may be a problem in terms of space-saving. However, the preferred embodiments of the present invention require no external connection terminal for connection of an external capacitor, thus contributing to space saving. Further, it is possible to prevent adverse impact of noise that develops from the external capacitor.

It should be noted that examples have been described in relation to the preferred embodiments of the present invention in which the signal processing section 720 handles analog-to-digital (A/D) conversion. However, the present invention is also applicable to column parallel A/D conversion CMOS sensors in which A/D conversion is handled by the signal readout circuit 710 on a column-by-column basis. That is, the preferred embodiments of the present invention are also applicable to column parallel A/D conversion. CMOS sensors adapted to handle A/D conversion on a column-by-column basis in the signal readout circuit 710. That is, the preferred embodiments of the present invention are applicable so long as a column parallel readout MOS solid-state imaging device is used that handles correlated double sampling.

It should be noted that the preferred embodiments of the present invention are merely possible examples of implementations. As explicitly pointed out in the preferred embodiments, there is a correspondence between the components of the preferred embodiments of the present invention and the particular matters of the invention as set forth in the appended claims. Similarly, there is a correspondence between the particular matters of the invention as set forth in the appended claims and the identically named components of the preferred embodiments of the present invention. It should be noted, however, that the present invention is not limited to the preferred embodiments, but may be implemented by modifying them in various manners without departing from the scope of the invention.

Further, the process steps described in relation to the preferred embodiments may be considered not only as a method having the series of steps but also as a program adapted to allow a computer to execute the series of steps and a recording medium adapted to store the program. A CD (Compact Disc), MD (MiniDisc), DVD (Digital Versatile Disk), memory card, Blu-ray Disk (registered trademark) or other medium may be used as the recording medium.

The present application contains subject matter related to that disclosed in Japanese Priority Patent Application JP 2009-263455 filed in the Japan Patent Office on Nov. 19, 2009, the entire content of which is hereby incorporated by reference.

What is claimed is:

1. A solid-state imaging device comprising:
a plurality of pixel circuits each of which converts an optical signal into a pixel signal;
a load current source circuit adapted to supply a load current, used to read out the pixel signal from the plurality of pixel circuits, to the pixel circuits on a column-by-column basis;
a signal readout circuit adapted to read out a reference signal and the pixel signal from the pixel circuits on a row-by-row basis and output the difference between the reference and pixel signals that have been read out; and
a control signal generation circuit adapted to generate a maintenance control signal used to maintain the load current constant during a readout period that lasts from when the reference signal is read out by the signal readout circuit to when the pixel signal is read out by the signal readout circuit, wherein
the load current source circuit includes
a plurality of load transistors adapted to supply the load current to the pixel circuits on a column-by-column basis,
a voltage holding circuit adapted to stabilize the gate voltages of the load transistors so as to maintain the load current constant, and
a voltage setting circuit adapted to set the voltage holding circuit to a constant hold voltage based on the maintenance control signal.

2. The solid-state imaging device of claim 1, wherein the control signal generation circuit generates a maintenance control signal used to maintain the load current constant during the readout period that lasts from when the reference signal is read out on a row-by-row basis to when the pixel signal is read out on a row-by-row basis.

3. The solid-state imaging device of claim 1, wherein
the voltage holding circuit includes a plurality of holding capacitors adapted to stabilize the gate voltages of the load transistors on a column-by-column basis of the plurality of pixel circuits, and
the voltage setting circuit includes a plurality of setting transistors each adapted to set one of the plurality of holding capacitors to the hold voltage based on the maintenance control signal.

4. The solid-state imaging device of claim 3, wherein the load current source circuit further includes:
a plurality of second load transistors adapted to supply the load current to the pixel circuits on a column-by-column basis;
a second voltage holding circuit adapted to stabilize the gate voltages of the second load transistors; and
a second voltage setting circuit adapted to set the second voltage holding circuit to the hold voltage.

5. The solid-state imaging device of claim 1, wherein
the control signal generation circuit generates a charge control signal used to charge the voltage holding circuit during a preparatory period prior to the start of the readout period, and
the voltage setting circuit connects the gate terminal of the reference transistor associated with the load transistor and one end of the voltage holding circuit based on the charge control signal.

6. A load current source circuit comprising:
load transistors each of which has its drain terminal connected to a vertical signal line adapted to supply a load current to pixel circuits;
a voltage holding circuit having its one end connected to the source terminals of the load transistors; and
a voltage setting circuit having its gate terminal connected to a maintenance control signal line adapted to supply a maintenance control signal so as to stabilize the load current and having its source terminal connected to the gate terminals of the load transistors and the other end of the voltage holding circuit.

* * * * *